Figure 1:
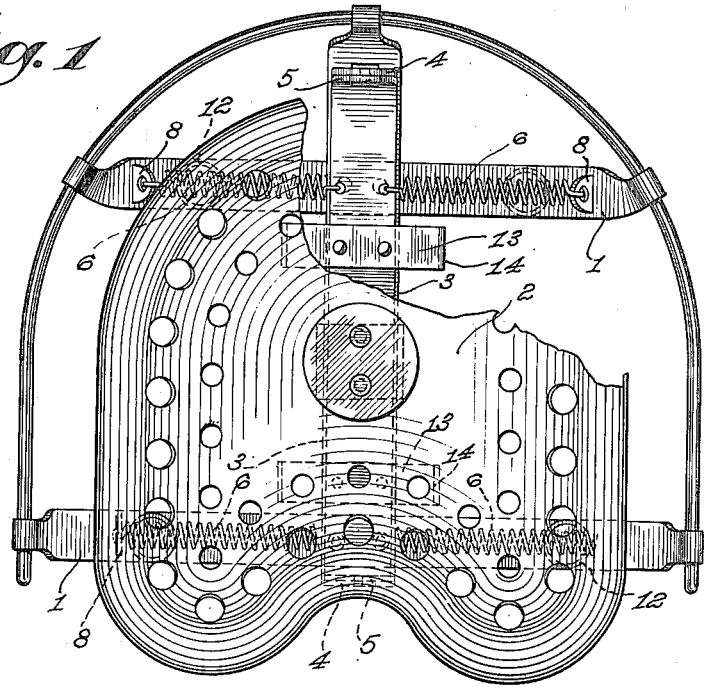

A. L. ETHERINGTON.
SPRING SEAT FOR AGRICULTURAL MACHINES.
APPLICATION FILED JULY 18, 1912.

1,093,042.

Patented Apr. 14, 1914.
2 SHEETS—SHEET 1.

Witnesses:

ALFRED LORENZO ETHERINGTON
Inventor

By

Attorneys

UNITED STATES PATENT OFFICE.

ALFRED LORENZO ETHERINGTON, OF MILTON, NOVA SCOTIA, CANADA.

SPRING-SEAT FOR AGRICULTURAL MACHINES.

1,093,042.          Specification of Letters Patent.     Patented Apr. 14, 1914.

Application filed July 18, 1912. Serial No. 710,110.

*To all whom it may concern:*

Be it known that I, ALFRED LORENZO ETHERINGTON, a subject of the King of Great Britain, residing at Milton, Province of Nova Scotia, Canada, have invented certain new and useful Improvements in Spring-Seats for Agricultural Machines; and I do hereby declare that the following is a full, clear, and exact description of the invention, such as will enable others skilled in the art to which it appertains to make and use the same.

The invention to be hereinafter described relates to spring seats for agricultural machines.

In order to more clearly disclose the construction, operation, and use of the invention, reference should be had to the accompanying drawings forming part of the present application.

Throughout the several figures of the drawings like reference characters designate the same parts.

Figure 2:
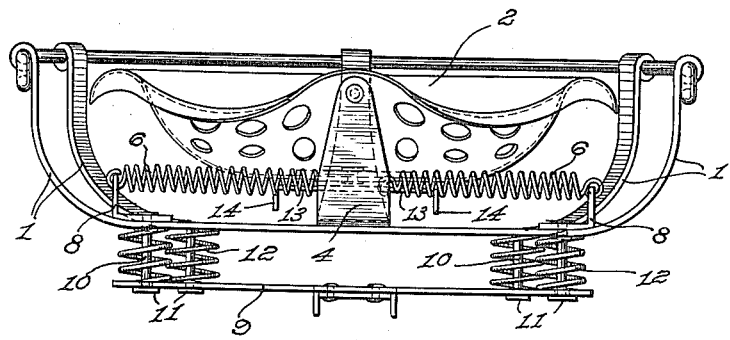
Figure 3:
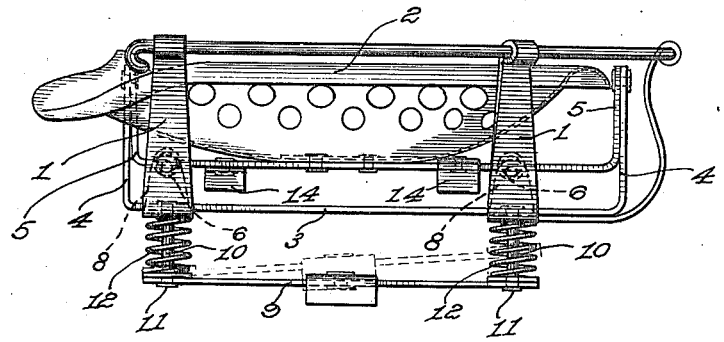
Figure 4:
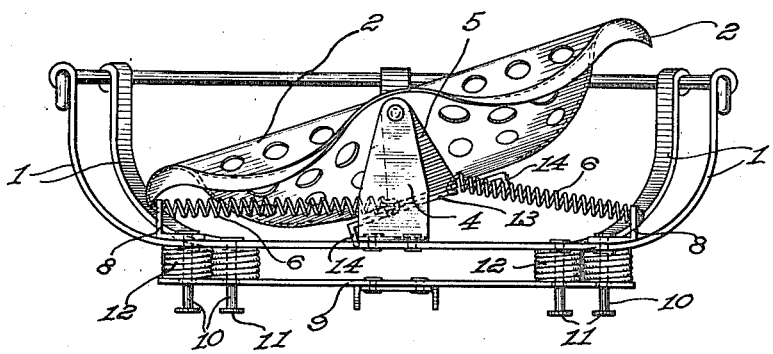

In the drawings: Figure 1 is a top plan view of the invention; Fig. 2 is a front view of the same; and Fig. 3 is a vertical cross section on line 3—3 of Fig. 1, looking in the direction of the arrows.

The main objects of the invention are to provide a simple, efficient, economical, durable, and compact spring seat which will completely avoid all side shocks and jars of the machine and, at the same time, one which will automatically adapt itself to the cant or incline of the machine when working on a hill side.

Referring to the drawings in detail, 1 indicates a skeleton frame in which the usual seat proper 2 is mounted. Extending from front to rear of this frame, along the longitudinal center thereof, is a bar 3 the opposite ends of which are turned up at right angles to form supporting arms or posts 4. In the upper ends of these arms is pivotally suspended a U shaped swinging bar 5 which is made fast to the bottom of the seat 2. Thus, the seat is hung like a pendulum from the upper ends of arms 4, as will be clear on reference to Figs. 1 and 2. In order to somewhat deaden or retard the swing, so that the seat will not be unstable or liable to sudden and unexpected tilts, springs 6 have been provided. Preferably, these springs are arranged in pairs, one pair near the front and one near the rear. The opposite ends of each spring of each pair are connected, respectively, to the swinging bar 5, and to small plates or brackets 8 secured to the skeleton frame near its opposite sides.
Springs 6 are tension springs and act in opposite directions. Their tendency is, therefore, to maintain the seat in the position substantially parallel with the skeleton frame 1, as clearly shown in Figs. 2 and 3.
They will yield to one side or the other under the weight of the driver, as the machine cants on a hill side. They also act as shock absorbers, during the operation of the machine. The usual side jars and shocks are imparted first to the skeleton frame 1 and, through the springs 6 and pendulum connection are completely deadened or absorbed. The result is an easy riding and non-vibrating seat.

Though side swinging of the seat is desirable, it is equally desirable to limit the amount of the side swing within a reasonable range. For this purpose, stop plates 13 have been provided. These plates are secured to the plate 5 and extend a considerable distance to either side of the center of the seat. Their ends are turned down as at 14 to form off sets which will engage the edges of the supporting bar 3 as the machine is canted to one side or the other, beyond a predetermined point, thus limiting the relative swinging movement between the seat 2 and skeleton frame 1.

Instead of mounting the skeleton frame 1 directly on the frame work of the machine, a supplemental H frame 9 is used. This H frame is solidly secured to the machine frame and is provided with perforations or holes in the free ends of the side bars.
These perforations are adapted to slidably receive pins 10 projecting from the skeleton frame and provided with enlarged heads 11 adapted to engage the under part of the H frame and limit the upward movement thereof. Coiled about each pin and arranged between the supplemental H frame 9 and the skeleton frame 1 is a cushion spring 12 adapted to absorb all vertical shocks.

It is thought that the operation and use of the invention will be clear from the preceding detailed description.

Changes may be made in the construction, arrangement, and disposition of the several parts of the invention without in any way departing from the field and scope of the same, and it is meant to include all such within this application wherein only the preferred form has been disclosed.

Having thus fully described my invention, what I claim as new and desire to secure by Letters Patent is:

A fixed frame, in combination with a bar pivotally suspended therein for lateral oscillation, a seat mounted on said bar and pairs of horizontal retarding springs arranged on each side of the front and rear of said seat and attached at their inner ends to said pivoted bar and at their outer ends to said frame, the pivots of said bar supporting the weight of the seat and thereby relieving the said springs therefrom.

In witness whereof I have hereunto set my hand in the presence of witnesses.

ALFRED LORENZO ETHERINGTON.

Witnesses:
JOHN GEORGE PYKE,
CHARLES WARMAN,
GEO. M. ANDERSON.